July 4, 1933.  G. J. HEINZ  1,917,203
FLUID STRAINER
Filed Aug. 27, 1931
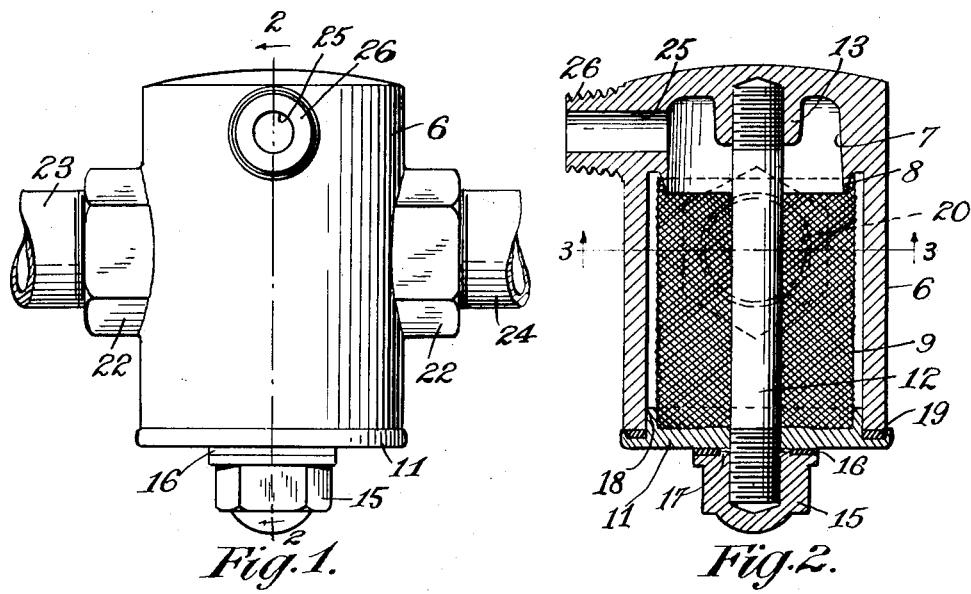
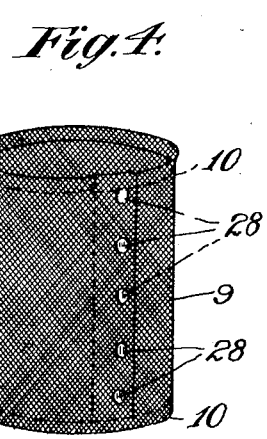
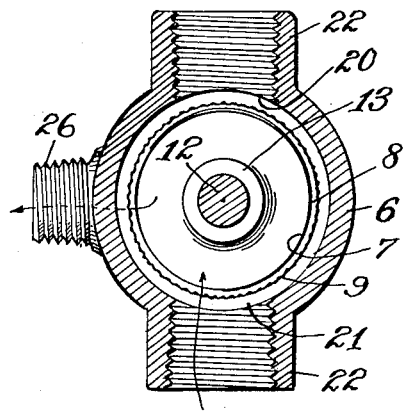
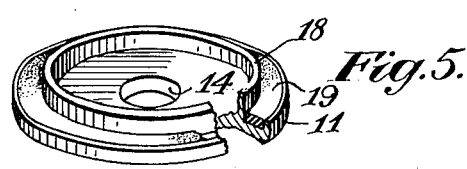
Inventor
G. J. Heinz
By John A. Seifert
Attorney Patented July 4, 1933

1,917,203

UNITED STATES PATENT OFFICE

GEORGE J. HEINZ, OF ROOSEVELT, NEW YORK, ASSIGNOR OF ONE-THIRD TO THOMAS J. PERRY, OF BROOKLYN, NEW YORK, AND ONE-THIRD TO GENERAL ENGINEERING COMPANY, A COPARTNERSHIP COMPRISING CHARLES F. SEMON AND ALBERT F. SEMON, OF NEWARK, NEW JERSEY

FLUID STRAINER

Application filed August 27, 1931. Serial No. 559,627.

This invention relates to fluid strainers adapted to be connected in pipe lines and particularly in lines for supplying cooling liquid to artificial refrigerators to separate scale, sediment and solid particles of various kinds from the liquid, and it is the principal object of the invention to provide a strainer which is automatically cleaned by the passage of the liquid through the pipe line, and thereby overcomes the disadvantage of frequent disassembling of the parts to clean the filtering screen that is experienced in the present strainers in use.

In the drawing accompanying and forming a part of this application, Figure 1 is an elevational view of the strainer connected in a pipe line.

Figure 2 is a longitudinal sectional view of the strainer taken on the line 2—2 of Figure 1 looking in the direction of the arrows.

Figure 3 is a cross sectional view taken on the line 3—3 of Figure 2 looking in the direction of the arrows.

Figure 4 is an elevational view of a filtering screen; and

Figure 5 is a perspective view of a closure plate for the filter screen supporting casing.

In carrying out the object of the invention as illustrated there is provided a cylindrical casing 6, one end of which is closed and arranged with a reduced bore to form with the closed end a cup shaped chamber 7 having a flange 8 extending toward the opposite end of the casing which is open and said flange being in parallel relation with the wall of the larger bore portion of the casing to form a seat for the engagement of one end of a filtering screen 9 of cylindrical shape and constructed of a fine wire mesh having the lateral mating edges connected by spot welding, as at 28 in Figure 4, with the edges at the ends folded over in juxtaposed relation to the body portion, as at 10 in Figure 4, to form a rolled edge to prevent unraveling of the mesh and to firmly engage the seat of flange 8.

The screen 9 is removably mounted in the seat of the casing in spaced relation to the wall of the larger bore portion of the casing by an annular plate 11 releasably engaged on the open end of the casing so that the plate may be removed from the casing without imparting any torsional strain on the casing or the connection thereof with a pipe line by arranging the casing with a rod 12 secured by screw-threading or welding in a boss 13 extended integrally from the closed end of the casing centrally of the chamber 7 with the free end of the rod extending through the open end of the casing for the engagement of a perforation 14 arranged centrally of the plate 11 and the plate is secured on the rod by a nut 15 having a packing gasket 16 engaged on a rib 17 extending from the inner face and about the periphery of the bore of the nut to prevent the material of the gasket from interfering with the threading of the nut on the rod but permitting the positioning of the gasket relative to the rod 12 and opening 14 in the plate 11 to provide a liquid tight joint between the nut and plate. The filtering screen is supported by the plate 11 in alined relation to the flange 8 by engaging the lower end 10 within an annular ridge or flange 18 extending from the inner face of the plate in spaced relation to the periphery to engage the inner wall of the casing, as shown in Figure 2, with the portion of the plate between the flange and periphery recessed for the engagement of an annular packing gasket 19, as shown in Figure 5, to abut the lower edge of the casing opening to prevent leakage between the casing and plate when the plate is drawn up into engagement with the casing by the nut 15.

The screen 9 is maintained free from sediment adhering to the mesh of the screen by directing a flow of the liquid over the exterior surface and directly through the screen, and from the casing. This is accomplished by arranging the casing with opposed openings 20, 21 extending in a direction transversely of the longitudinal axis of the casing and intermediate the ends thereof and arranged with internally threaded bosses 22 extending from the sides of the casing for the connection of liquid carrying pipes 23, 24 of a pipe line.

The interior of the screen is connected to the refrigerator by an outlet opening 25 extending through the casing wall from the reduced chamber 7 adjacent the closed end, as shown in Figure 2, and having a nipple portion 26 extending laterally from the exterior of the casing and screw-threaded for connection with a pipe, not shown, connecting the casing to the refrigerator.

The diameter of the openings 20, 21 is approximately twice the diameter of the outlet opening 25, so that all the liquid delivered by pipe 24 through the opening 21, which opening, in the present instance, is the inlet to the casing of the pipe line, as indicated by the arrow in Figure 3, does not leave the casing through the outlet opening 25 but a sufficient quantity of the liquid is drawn off by the pipe 23 to create currents of the liquid from opening 21 to opening 20 passing around the exterior surface of the screen between the screen and interior casing wall and also directly through the mesh of the screen in line with the openings 20, 21, which currents of the liquid will release the sediment and foreign matter from the mesh and carry the same to pipe 23. The flow of the filtered liquid passing from the interior of the screen to the outlet opening 25 is not great enough in comparison with the force of the flow of the liquid from opening 21 to opening 20, to carry any sediment from the screen to the refrigerator.

It will be obvious that various modifications may be made in the construction and arrangement of parts, and that portions of the invention may be used without others, without departing from the scope of the invention.

Having thus described my invention, I claim.

1. In a strainer for pipe lines, a cylindrical casing having one end open and arranged with opposed openings intermediate the ends of the casing adapted to connect the casing in a pipe line, a portion of reduced diameter arranged in the end of the casing opposite to the open end and having a flange extending as a continuation of said portion and in spaced relation to the casing wall and terminating out of alinement with the opposed openings, a plate member having an annular flange to engage the interior wall of the casing to close the open end of the casing and the plate being arranged to be secured to the casing, a cylindrical screen engaged on the exterior of the flange of the portion of reduced diameter and within the annular flange of the plate member, and an outlet opening arranged in the casing to extend in a plane parallel to and in a direction transversely of the axis of the opposed openings and in communication with the portion of reduced diameter of the casing and the interior of the screen.

2. In a strainer for pipe lines, a cylindrical casing having one end open and arranged with opposed openings intermediate the ends of the casing adapted to connect the casing in a pipe line, a reduced cup shaped chamber arranged in the end of the casing opposite to the open end, a rod fixed in the reduced chamber of the casing extending through the open end of the casing, a plate member engaged and secured on the rod to close the open end of the casing, a cylindrical screen supported in the casing between the reduced portion and the plate in interposed relation to the opposed openings, and an outlet opening arranged to extend through the casing wall in a plane parallel to the axis of the opposed openings and in communication with the reduced chamber and the interior of the screen.

Signed in Brooklyn, county of Kings, city and State of New York, this 28 day of July, 1931.

GEORGE J. HEINZ.

CERTIFICATE OF CORRECTION.

Patent No. 1,917,203.　　　　　　　　　　　　　　　　　　　July 4, 1933.

GEORGE J. HEINZ.

It is hereby certified that the name of the second mentioned assignee of one-third interest in the above numbered patent was erroneously described and specified as "General Engineering Company", whereas said name should have been described and specified as "Generant Engineering Company", as shown by the records of assignments in this office; and that the said Letters Patent should be read with this correction therein that the same may conform to the record of the case in the Patent Office.

Signed and sealed this 29th day of August, A. D. 1933.

(Seal)
　　　　　　　　　　　　　　　　　　　　　　　　　　M. J. Moore.
　　　　　　　　　　　　　　　　　　　　　　Acting Commissioner of Patents.